(12) United States Patent
Ramin

(10) Patent No.: US 12,489,266 B2
(45) Date of Patent: Dec. 2, 2025

(54) PROLONGED LIFE LASER CHAMBER ELECTRODE AND LASER HAVING SAME

(71) Applicant: Cymer, LLC, San Diego, CA (US)

(72) Inventor: Leyla Ramin, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 1193 days.

(21) Appl. No.: 17/272,999

(22) PCT Filed: Aug. 28, 2019

(86) PCT No.: PCT/US2019/048622
§ 371 (c)(1),
(2) Date: Mar. 3, 2021

(87) PCT Pub. No.: WO2020/060735
PCT Pub. Date: Mar. 26, 2020

(65) Prior Publication Data
US 2021/0257797 A1    Aug. 19, 2021

Related U.S. Application Data

(60) Provisional application No. 62/733,708, filed on Sep. 20, 2018.

(51) Int. Cl.
*H01S 3/038* (2006.01)
*C22C 9/00* (2006.01)
*C22C 19/00* (2006.01)
*C22C 19/07* (2006.01)
(Continued)

(52) U.S. Cl.
CPC ............. *H01S 3/0388* (2013.01); *C22C 9/00* (2013.01); *C22C 19/002* (2013.01); *C22C 19/07* (2013.01); *H01S 3/0971* (2013.01); *H01S 3/225* (2013.01)

(58) Field of Classification Search
CPC ...... H01S 3/0388; H01S 3/225; H01S 3/0971; C22C 19/002; C22C 19/07
See application file for complete search history.

(56) References Cited

U.S. PATENT DOCUMENTS 3,899,751 A    8/1975  Hochuli
4,546,222 A *  10/1985 Watanabe ............ H01H 1/0203
                                                    218/132
(Continued)

FOREIGN PATENT DOCUMENTS

CN      85107530 A     9/1986
CN      1196504 A     10/1998
(Continued)

OTHER PUBLICATIONS

"Some aspects of removal of copper and cobalt from mixed ion dilute solutions" Pilla et al.*
(Continued)

*Primary Examiner* — M. A. Golub-Miller
(74) *Attorney, Agent, or Firm* — DiBerardino McGovern IP Group LLC

(57) ABSTRACT

Disclosed is an electrode for a laser chamber comprising an alloy of a first metal having a first free energy of formation with fluorine greater than or equal to the free energy of formation with fluorine of copper, and a second metal having a second free energy of formation with fluorine less than the first free energy.

12 Claims, 5 Drawing Sheets

(51) Int. Cl.
*H01S 3/0971* (2006.01)
*H01S 3/225* (2006.01)

(56) References Cited

U.S. PATENT DOCUMENTS

| | | | | |
|---|---|---|---|---|
| 5,373,523 A * | 12/1994 | Fujimoto | ............... | H01S 3/036 |
| | | | | 372/98 |
| 6,690,706 B2 | 2/2004 | Morton et al. | | |
| 6,914,372 B1 * | 7/2005 | Akiyama | ............... | B82Y 10/00 |
| | | | | 977/939 |
| 7,301,980 B2 * | 11/2007 | Steiger | ................. | H01S 3/0385 |
| | | | | 372/87 |
| 7,535,948 B2 | 5/2009 | Steiger et al. | | |
| 2001/0050937 A1 * | 12/2001 | Hori | ........................ | H01S 3/038 |
| | | | | 372/55 |
| 2003/0042436 A1 * | 3/2003 | Hori | ........................ | H01S 3/038 |
| | | | | 250/493.1 |
| 2005/0047471 A1 | 3/2005 | Steiger et al. | | |
| 2006/0281202 A1 | 12/2006 | Ishida et al. | | |
| 2012/0155501 A1 | 6/2012 | Ferrasse et al. | | |
| 2013/0062646 A1 * | 3/2013 | Yen | .................... | H01L 21/6838 |
| | | | | 257/E33.061 |
| 2013/0248816 A1 * | 9/2013 | Chu | .................... | H01L 21/461 |
| | | | | 438/47 |
| 2013/0329763 A1 | 12/2013 | Kardokus et al. | | |
| 2015/0144486 A1 * | 5/2015 | Cho | .................... | G01N 27/3277 |
| | | | | 525/453 |
| 2016/0172817 A1 * | 6/2016 | Kakizaki | ............... | H01S 3/0384 |
| | | | | 372/86 |
| 2018/0320250 A1 * | 11/2018 | Ramin | .................. | H01S 3/2251 |
| 2020/0328074 A1 * | 10/2020 | Ramin | .................. | H01S 3/0382 |

FOREIGN PATENT DOCUMENTS

| | | |
|---|---|---|
| CN | 1477737 A | 2/2004 |
| CN | 104350650 A | 2/2015 |
| DE | 1589011 A1 | 3/1970 |
| GB | 1172378 A | 11/1969 |
| JP | H08139390 A | 5/1996 |
| JP | H11330610 | 11/1999 |
| JP | 2001015830 A | 1/2001 |
| JP | 2001274487 A | 10/2001 |
| JP | 2013141030 A | 7/2013 |
| NL | 7710958 A | 4/1979 |
| TW | 201112304 A | 4/2011 |

OTHER PUBLICATIONS

Office Action, counterpart Chinese Patent Application No. 201980061865.X, mailed Mar. 17, 2023, 23 pages total (including partial English translation of 14 pages).

James G. Speight, Lange's Handbook of Chemistry, 16th Edition, The McGraw-Hill Companies, pp. 246-247, 279, (2005).

Shane Thomas, United States International Searching Authority, International Search Report and Written Opinion, corresponding PCT Application No. PCT/US2019/048622, mailed Nov. 19, 2019, 12 pages total.

Office Action, counterpart Japanese Patent Application No. 2021-512575, mailed Jan. 27, 2022, 7 pages total (including English translation of 4 pages).

Office Action, counterpart Chinese Patent Application No. 201980061865.X, mailed Dec. 6, 2022, 23 pages total (including English translation of 10 pages).

David R. Lide et al., Standard Thermodynamic Properties of Chemical Substances, CRC Handbook of Chemistry and Physics, 90th Edition, CD-ROM Version 2010, 3 pages total.

Office Action, counterpart Chinese Patent Application No. 201980061865.X, mailed Apr. 21, 2022, 12 pages total (including English translation of 5 pages).

Office Action, counterpart Chinese Patent Application No. 201980061865.X, mailed Sep. 3, 2021, 17 pages total (including English translation of 8 pages).

Office Action, counterpart Korean Patent Application No. 10-2021-7008289, mailed Feb. 7, 2022, 9 pages total (including English translation of 3 pages).

* cited by examiner

PROLONGED LIFE LASER CHAMBER ELECTRODE AND LASER HAVING SAME

CROSS-REFERENCE TO RELATED APPLICATIONS

This application claims priority of U.S. application 62/733,708 which was filed on Sep. 20, 2018 and which is incorporated herein in its entirety by reference.

FIELD

The present disclosed subject matter relates to laser-generated light sources such as are used for integrated circuit photolithographic manufacturing processes.

BACKGROUND

In laser discharge chambers such as an ArF power ring amplifier excimer discharge chamber ("PRA") or a KrF excimer discharge chamber, electrode erosion imposes significant limits on the useful lifetime of the chamber module. One measure to extend the useful lifetime of a KrF excimer discharge chamber module involves making the anode of a material which resists wear. Information on materials suitable for use as anode materials can be found, for example, in U.S. Pat. No. 7,301,980, issued Nov. 27, 2007, and U.S. Pat. No. 6,690,706 issued Feb. 10, 2004, both of which are assigned to the assignee of the present application and both of which are hereby incorporated by reference in their entirety.

Fluorine-containing plasmas are highly corrosive to metals and so result in electrode corrosion and erosion during operation of the chamber. For example, nucleation and growth of localized zones of corrosion product build-up on the surface of the anode may occur. This leads to non-uniformity in discharges between the electrodes and downstream arcing. The build-up of these islands of corrosion may be referred to as "reef" formation or "reefing." The spots at which reefing occurs on an electrode protrude into the plasma more so than the rest of the surface of the electrode. As such, reefing can cause arcing to occur in the plasma. Arcing in the plasma is undesirable because it robs the laser chamber of energy because energy goes into the arc discharge rather than into the laser cavity. Thus when a significant amount of arcing occurs in the plasma, the electrodes must be replaced to keep the laser chamber operating efficiently. As such, reefing shortens the lifetime during which electrodes can be used effectively in a laser chamber.

Erosion leads to both an increase in the width of the discharge gap and broadening of the discharge. Both of these phenomena lead to lower energy density in the discharge which in turn drives a need to increase the voltage differential across the electrodes necessary to maintain energy output. In addition, discharge broadening reduces the clearing ratio of the gas flow leading to increased downstream arcing leading to energy dropouts and resultant dose errors. Once the dose error rate increases above a predetermined threshold the chamber is deemed to have reached the end of its useful life and must be replaced.

Thus one critical issue is the chemical reaction between the electrode materials and the fluorine gas that causes the continuous formation and growth of reef-like layers which result in blocking the electrodes from efficient plasma formation due to the uneven electrode corrosion.

SUMMARY

The following presents a simplified summary of one or more embodiments in order to provide a basic understanding of the present invention. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

According to one aspect of an embodiment, there is disclosed an electrode for a laser chamber, the electrode comprising an alloy of a first metal having a first free energy of formation with fluorine greater than or equal to the free energy of formation with fluorine of copper, and a second metal having a second free energy of formation with fluorine less than the first free energy. The first metal may be cobalt because it has a greater energy of formation in a CO—Cu alloy. The second metal may be copper because it has a lower energy of formation in a CO—Cu alloy. The alloy may be CoCu (5-15 wt %). The alloy may be Co90Cu10 wt %. The second metal may be silver. The alloy may be Cu(x)Ag(100−x) wt % where x is in the range of about 95 to about 60. The alloy may be Cu60Ag40 wt %.

According to another aspect of an embodiment, there is disclosed a laser having a discharge chamber and a first electrode positioned at least partially within the discharge chamber, the first electrode comprising an alloy of a first metal having a first free energy of formation with fluorine greater than or equal to the free energy of formation with fluorine of copper, and a second metal having a second free energy of formation with fluorine less than the first free energy. The electrode may be an anode. The first metal may be cobalt. The second metal may be copper. The alloy may be CoCu (5-15 wt %). The alloy may be Co90Cu10 wt %. The second metal may be silver. The alloy may be Cu(x)Ag(100−x) wt % where x is in the range of about 95 to about 60. The alloy may be Cu60Ag40 wt %.

Further embodiments, features, and advantages of the present invention, as well as the structure and operation of the various embodiments are described in detail below with reference to accompanying drawings.

BRIEF DESCRIPTION OF THE DRAWING

The accompanying drawings, which are incorporated herein and form part of the specification, illustrate the methods and systems of embodiments of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements.

Figure 1:
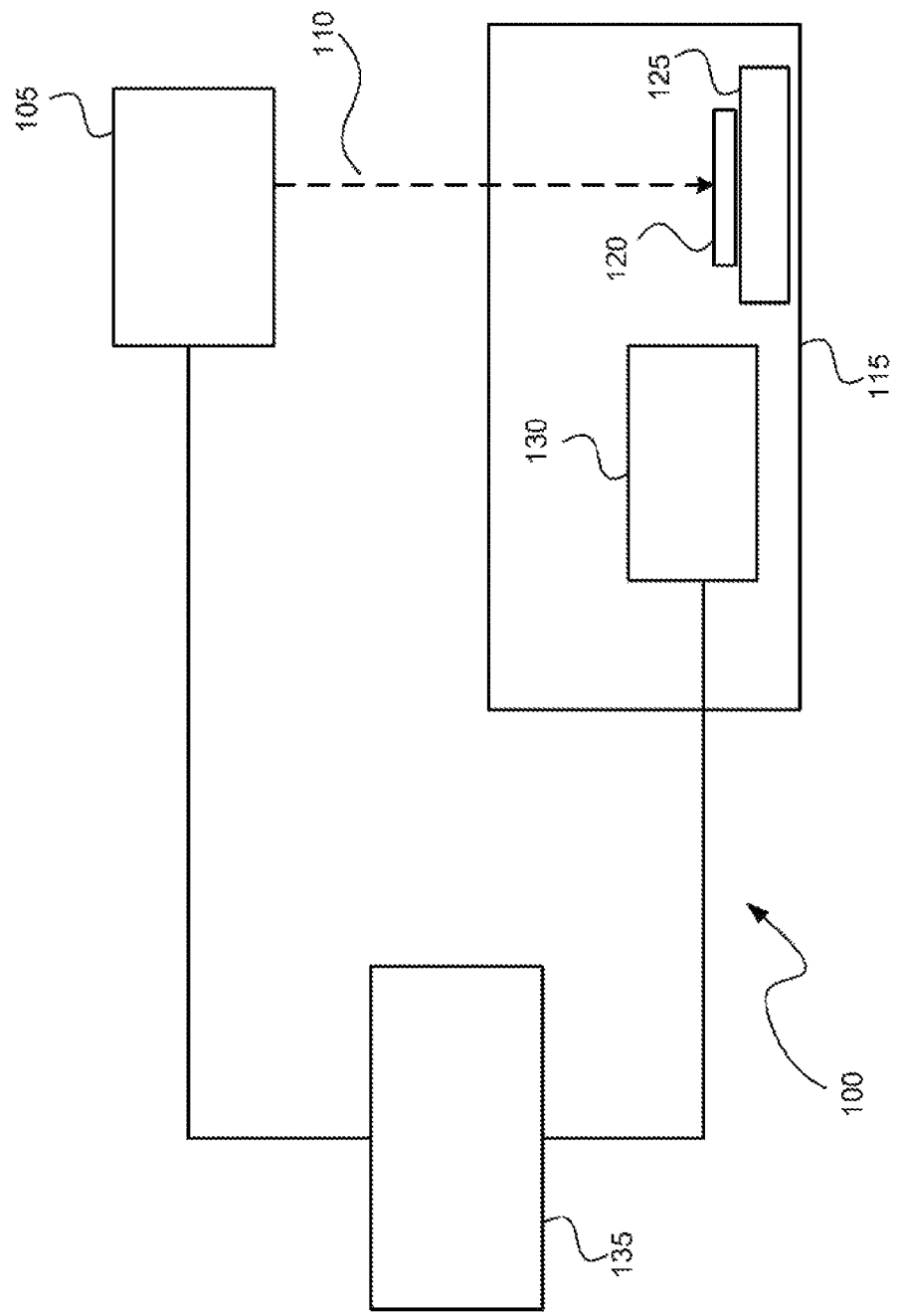
FIG. 1 shows a schematic, not to scale, view of an overall broad conception of a photolithography system according to an aspect of the disclosed subject matter.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments.

Referring to FIG. 1, a photolithography system 100 includes an illumination system 105. As described more fully below, the illumination system 105 includes a light source that produces a pulsed light beam 110 and directs it to a photolithography exposure apparatus or scanner 115 that patterns microelectronic features on a wafer 120. The wafer 120 is placed on a wafer table 125 constructed to hold wafer 120 and connected to a positioner configured to accurately position the wafer 120 in accordance with certain parameters.

The photolithography system 100 uses a light beam 110 having a wavelength in the deep ultraviolet (DUV) range, for example, with wavelengths of 248 nanometers (nm) or 193 nm. The minimum size of the microelectronic features that can be patterned on the wafer 120 depends on the wavelength of the light beam 110, with a lower wavelength resulting in a smaller minimum feature size. When the wavelength of the light beam 110 is 248 nm or 193 nm, the minimum size of the microelectronic features can be, for example, 50 nm or less. The bandwidth of the light beam 110 can be the actual, instantaneous bandwidth of its optical spectrum (or emission spectrum), which contains information on how the optical energy of the light beam 110 is distributed over different wavelengths. The scanner 115 includes an optical arrangement having, for example, one or more condenser lenses, a mask, and an objective arrangement. The mask is movable along one or more directions, such as along an optical axis of the light beam 110 or in a plane that is perpendicular to the optical axis. The objective arrangement includes a projection lens and enables the image transfer to occur from the mask to the photoresist on the water 120. The illumination system 105 adjusts the range of angles for the light beam 110 impinging on the mask. The illumination system 105 also homogenizes (makes uniform) the intensity distribution of the light beam 110 across the mask.

The scanner 115 can include, among other features, a lithography controller 130, air conditioning devices, and power supplies for the various electrical components. The lithography controller 130 controls how layers are printed on the wafer 120. The lithography controller 130 includes a memory that stores information such as process recipes. A process program or recipe determines the length of the exposure on the wafer 120 based on, for example, the mask used, as well as other factors that affect the exposure. During lithography, a plurality of pulses of the light beam 110 illuminates the same area of the wafer 120 to constitute an illumination dose.

The photolithography system 100 also preferably includes a control system 135. In general, the control system 135 includes one or more of digital electronic circuitry, computer hardware, firmware, and software. The control system 135 also includes memory which can be read-only memory and/or random access memory. Storage devices suitable for tangibly embodying computer program instructions and data include all forms of non-volatile memory, including, by way of example, semiconductor memory devices, such as EPROM, EEPROM, 10 and flash memory devices: magnetic disks such as internal hard disks and removable disks; magneto-optical disks; and CD-ROM disks.

The control system 135 can also include one or more input devices (such as a keyboard, touch screen, microphone, mouse, hand-held input device, etc.) and one or more output devices (such as a speaker or a monitor). The control system 135 also includes one or more programmable processors, and one or more computer program products tangibly embodied in a machine-readable storage device for execution by one or more programmable processors. The one or more programmable processors can each execute a program of instructions to perform desired functions by operating on input data and generating appropriate output. Generally, the processors receive instructions and data from the memory. Any of the foregoing may be supplemented by, or incorporated in, specially designed ASICs (application-specific integrated circuits). The control system 135 can be centralized or be partially or wholly distributed throughout the photolithography system 100.

Figure 2:
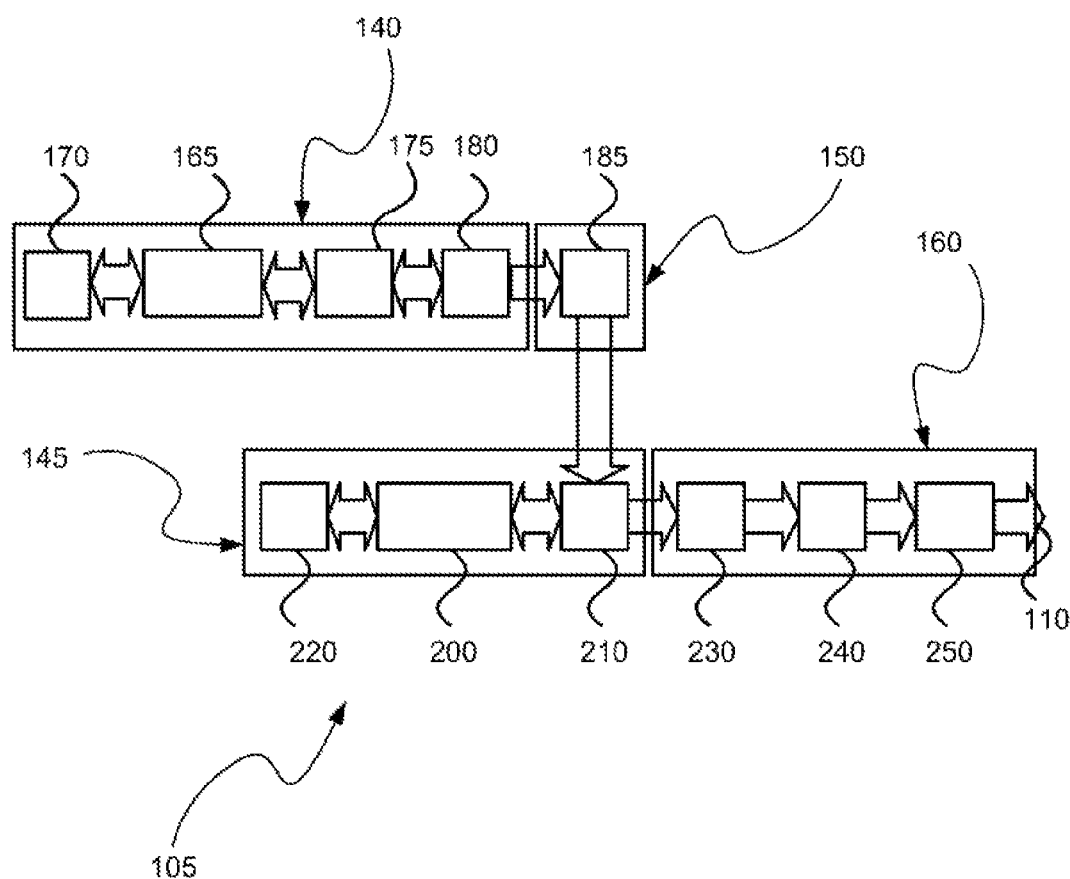
FIG. 2 shows a schematic, not to scale, view of an overall broad conception of an illumination system according to an aspect of the disclosed subject matter.

Referring to FIG. 2, an exemplary illumination system 105 is a pulsed laser source that produces a pulsed laser beam as the light beam 110. FIG. 2 shows illustratively and in block diagram a gas discharge laser system according to an embodiment of certain aspects of the disclosed subject matter. The gas discharge laser system may include, e.g., a solid state or gas discharge seed laser system 140, an amplification stage, e.g., a power ring amplifier ("PRA") stage 145, relay optics 150 and laser system output subsystem 160. The seed system 140 may include, e.g., a master oscillator ("MO") chamber 165.

The seed laser system 140 may also include a master oscillator output coupler ("MO OC") 175, which may comprise a partially reflective mirror, forming with a reflective grating (not shown) in a line narrowing module ("LNM") 170, an oscillator cavity in which the seed laser 140 oscillates to form the seed laser output pulse. i.e., forming a master oscillator ("MO"). The system may also include a line-center analysis module ("LAM") 180. The LAM 180 may include an etalon spectrometer for fine wavelength measurement and a coarser resolution grating spectrometer. A MO wavefront engineering box ("WEB") 185 may serve to redirect the output of the MO seed laser system 140 toward the amplification stage 145, and may include, e.g., beam expansion with, e.g., a multi prism beam expander (not shown) and coherence busting, e.g., in the form of an optical delay path (not shown).

The amplification stage 145 may include, e.g., a PRA lasing chamber 200, which may also be an oscillator, e.g., formed by seed beam injection and output coupling optics (not shown) that may be incorporated into a PRA WEB 210 and may be redirected back through the gain medium in the chamber 200 by a beam reverser 220. The PRA WEB 210 may incorporate a partially reflective input/output coupler (not shown) and a maximally reflective mirror for the nominal operating wavelength (e.g., at around 193 nm for an ArF system) and one or more prisms.

A bandwidth analysis module ("BAM") 230 at the output of the amplification stage 145 may receive the output laser light beam of pulses from the amplification stage and pick off a portion of the light beam for metrology purposes, e.g., to measure the output bandwidth and pulse energy. The laser output light beam of pulses then passes through an optical pulse stretcher ("OPUS") 240 and an output combined autoshutter metrology module ("CASMM") 250, which may also be the location of a pulse energy meter. One purpose of the OPUS 240 may be, e.g., to convert a single output laser pulse into a pulse train. Secondary pulses created from the original single output pulse may be delayed with respect to each other. By distributing the original laser pulse energy into a train of secondary pulses, the effective pulse length of the laser can be expanded and at the same time the peak pulse intensity reduced. The OPUS 240 can thus receive the laser beam from the PRA WEB 210 via the BAM 230 and direct the output of the OPUS 240 to the CASMM 250.

Figure 3:
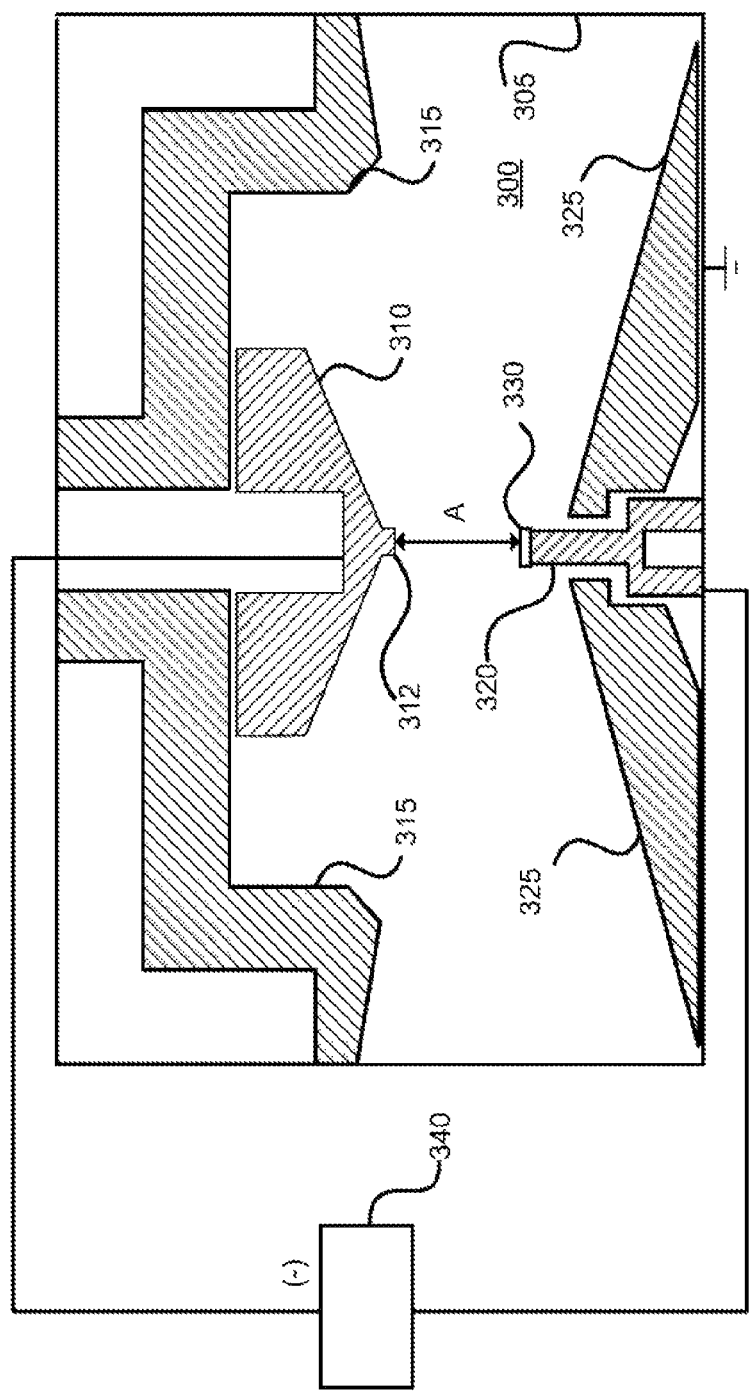
FIG. 3 is a diagrammatic cross section, not to scale, of a discharge chamber for an excimer laser according to aspects of the disclosed subject matter.

The PRA lasing chamber 200 and the MO 165 are configured as chambers in which electrical discharges between electrodes may cause lasing gas discharges in a lasing gas to create an inverted population of high energy molecules, including, e.g., Ar. Kr, and/or Xe, to produce relatively broad band radiation that may be line narrowed to a relatively very narrow bandwidth and center wavelength selected in a line narrowing module ("LNM") 170, as is known in the art. A configuration for such a chamber 300 is shown in FIG. 3, which is a highly stylized cross-sectional diagram of a discharge chamber. A chamber 300 includes an upper electrode 310 acting as a cathode and a lower electrode 320 acting as an anode. One or both of the lower electrode 300 and the upper electrode 310 may be entirely contained in the pressure envelope of chamber 300 defined by the chamber wall 305 or one of the electrodes may not be so contained. Lasing gas discharges occur between these two electrodes in a gap having a width A. Also shown in FIG. 3 are an upper insulator 315 and a lower insulator 325. The lower electrode 320 is electrically connected to the wall 305 of the chamber 300. For safety reasons it is desirable to maintain the chamber wall 300 and so the lower electrode 320 at ground potential. In the embodiment shown in FIG. 3, the upper electrode 310 is driven by a voltage supply 340 at a voltage which is negative with respect to the lower electrode 320.

When it is acting as an anode as shown in FIG. 3, the lower electrode 320 is beneficially made of a material which does not exhibit wear, but which in fact grows a corrosion resistant coating 330. The size of the coating 330 is exaggerated in FIG. 3 for illustration purposes. Note also that the upper electrode is provided with a small bump 312.

As mentioned, also shown in FIG. 3 is a voltage supply 340 which establishes a voltage gradient across cathode 310 and anode 320. While the notation (−) is shown for the polarity of the output of the voltage supply 340 it will be understood that this is a relative rather than absolute polarity, that is, relative to the polarity of the lower electrode 320, which will generally be in electrical contact with the body of the chamber 300 and must remain held at a ground (0) potential. The upper electrode (cathode 310) is charged to a large (for example about 20 kV) negative voltage.

Reefing and a high erosion rate are issues in the MO. These are the result of fluorine reactions with the electrode materials. According to one aspect of an embodiment, the electrodes are made of alloys including a first metal with an energy of formation with $F_2$ equal to or greater than that of copper and a second metal with an energy of formation with $F_2$ lower than the energy of formation with $F_2$ than the first metal. The alloys include a metal such as copper which has good thermal and electrical conductivity and good resistivity against fluoridation. Other such metals would include nickel, cobalt, and silver. Unalloyed pure elements are typically relatively soft compared to common structural metals and have very high thermal expansion that would cause high erosion rate. It is therefore advantageous to alloy them with another metal such a copper to increase the hardness and potentially decrease the erosion rate.

The free energy of formation, also called the standard Gibbs free energy of formation of a compound, is the change of Gibbs free energy that accompanies the formation of 1 mole of a substance in its standard state from its constituent elements in their standard states (the most stable form of the element at 1 bar of pressure and the specified temperature, usually 298.15 K or 25° C.).

The protective layer formed on top of the electrode surface as the result of reaction of the second metal with fluorine also plays important role in reducing the fluorine reaction with the bulk material of the electrodes. The more dense and uniform the protective layer is, the more it can be expected that the erosion rate will decrease. Co90Cu10 wt % shows a dense and continuous film layer formation under operational conditions. This is in a range of relative weight percentages CoCu (5-15 wt %) that can also be expected to show a dense and continuous film layer formation under operational conditions As mentioned, silver also exhibits a low standard free energy of formation with $F_2$. Cu60Ag40 wt % also shows a dense and continuous film layer formation under operational conditions. This is in a range of relative weight percentages 5-40 wt % Ag—Cu that can also be expected to show a dense and continuous film layer formation under operational conditions.

Figure 4B:
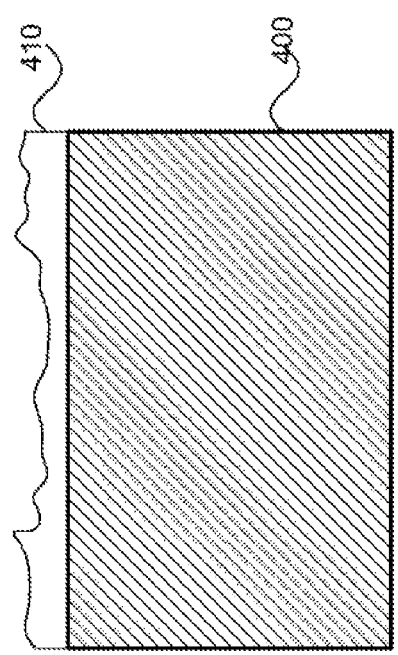
FIGS. 4A and 4B are diagrams comparing the protective layers on two electrodes of different materials.
Figure 4A:
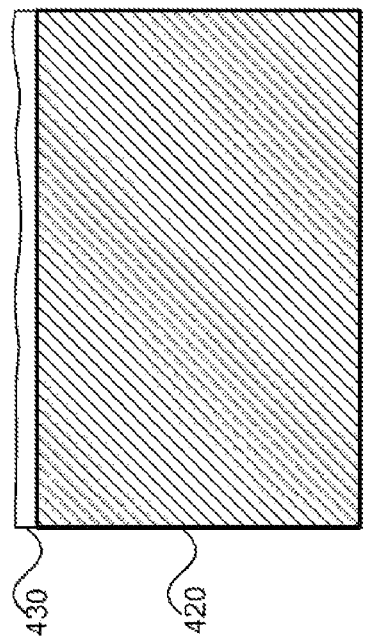

The effects of using these alloys as opposed to conventional materials is illustrated in FIGS. 4A and 4B. FIG. 4A shows the effects of fluorine reactions with the bulk material 400 of an electrode made of brass. As can be seen, a protective layer 410 forms on the bulk material 400 but the layer 410 is nonuniform and exhibits cracks. On the other hand FIG. 4B shows the effects of fluorine reactions with the bulk material 420 of an electrode made of Co90Cu10 wt %. As can be seen, a protective layer 410 forms on the bulk material 400 but the layer 410 is more uniform and exhibits less cracking than layer 410. These layers were formed on CO—Cu and Ag—Cu samples placed in a TGA (thermogravimetric analysis) furnace at 450° C. and 1% $F_2$, (similar to chamber conditions). The passivation layer was detected in SEM-EDX.

Referring back to FIG. 3, the lower electrode 320 when used as an anode may beneficially be made of the alloys described above so that the corrosion resistant coating (passivation layer) 330 that forms in use is denser and more continuous and has good adherence to the main body of the electrode.

Figure 5A:
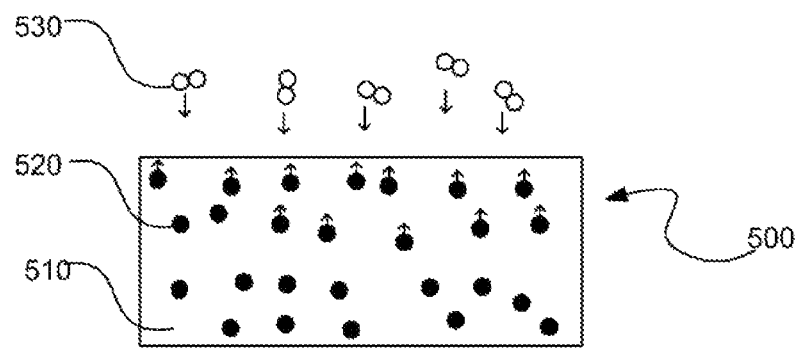
FIGS. 5A and 5B are diagrams explaining some theoretical principles according to aspects of the disclosed subject matter.
Figure 5B:
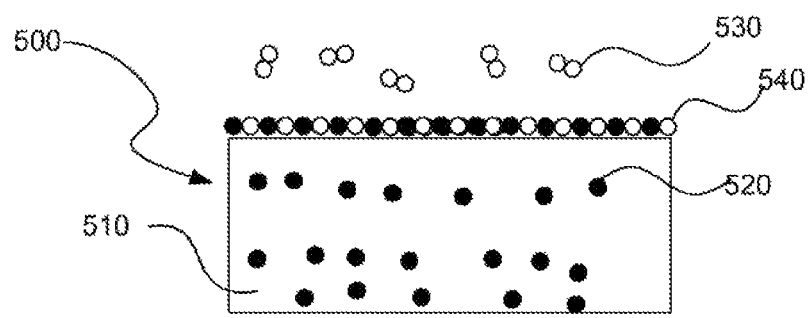

FIGS. 5A and 5B depict principles that are believed to underlie the observed effects. FIG. 5A shows an electrode bulk material 500 made up of atoms of a first metal 510 and atoms of a second metal 520 in an environment where the bulk material 500 is exposed to fluorine molecules 530. As mentioned, the first metal has a free energy of formation with fluorine that is equal to or greater than that of copper. For example, the first metal may be cobalt or silver. The second metal has a free energy of formation with fluorine that is lower than the free energy information with fluorine of the first metal. For example, the second metal may be copper. As shown in FIG. 5B, atoms of the second metal 520 migrate to the interface with the environment containing fluorine where they combine with fluorine to form passivating layer 540. Of course, other or additional principles may also contribute to the observed effects and embodiments are not limited to arrangements in which these principles apply.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Other aspects of the invention are set out in the following numbered clauses.

1. An electrode for a laser chamber, the electrode comprising an alloy of a first metal having a first free energy of formation with fluorine greater than or equal to the free energy of formation with fluorine of copper, and a second metal having a second free energy of formation with fluorine less than the first free energy.
2. An electrode for a laser chamber as in clause 1 wherein the first metal is cobalt.
3. An electrode for a laser chamber as in clause 1 wherein the second metal is copper.
4. An electrode for a laser chamber as in clause 1 wherein the first metal is cobalt and the second metal is copper.
5. An electrode for a laser chamber as in clause 4 wherein the alloy is CoCu (5-15 wt %)
6. An electrode for a laser chamber as in clause 5 wherein the alloy is Co90Cu10 wt %.
7. An electrode for a laser chamber as in clause 1 wherein the second metal is silver.
8. An electrode for a laser chamber as in clause 1 wherein the first metal is copper and the second metal is silver.
9. An electrode for a laser chamber as in clause 8 wherein the alloy is Cu(x)Ag(100−x) wt % where x is in the range of about 95 to about 60.
10. An electrode for a laser chamber as in clause 9 wherein the alloy is Cu60Ag40 wt %.
11. An electrode for a laser chamber, the electrode comprising an alloy of a cobalt and copper.
12. An electrode for a laser chamber as in clause 11 wherein the alloy is CoCu (5-15 wt %).
13. An electrode for a laser chamber as in clause 11 wherein the alloy is Co90Cu10 wt %.
14. An electrode for a laser chamber, the electrode comprising an alloy of a copper and silver.
15. An electrode for a laser chamber as in clause 14 wherein the alloy is Cu(x)Ag(100−x) wt % where x is in the range of about 95 to about 60.
16. An electrode for a laser chamber as in clause 14 wherein the alloy is Cu60Ag40 wt %.
17. A laser comprising:
a discharge chamber; and
a first electrode positioned at least partially within the discharge chamber, the first electrode comprising an alloy of a first metal having a first free energy of formation with fluorine greater than or equal to the free energy of formation with fluorine of copper, and a second metal having a second free energy of formation with fluorine less than the first free energy.
18. A laser as in clause 17 wherein the electrode is an anode.
19. A laser as in clause 17 wherein the first metal is cobalt.
20. A laser as in clause 17 wherein the second metal is copper.
21. A laser as in clause 17 wherein the first metal is cobalt and the second metal is copper.
22. A laser as in clause 21 wherein the alloy is CoCu (5-15 wt %).
23. A laser as in clause wherein the alloy is Co90Cu10 wt %.
24. A laser as in clause 17 wherein the second metal is silver.
25. A laser as in clause 17 wherein the first metal is copper and the second metal is silver.
26. A laser as in clause 25 wherein the alloy is Cu(x)Ag (100-x) wt % where x is in the range of about 95 to about 60.
27. A laser as in clause 26 wherein the alloy is Cu60Ag40 wt %.
28. A laser comprising:
a discharge chamber; and
a first electrode positioned at least partially within the discharge chamber, the first electrode comprising an alloy of cobalt and copper.
29. A laser as in clause 28 wherein the alloy is CoCu (5-15 wt %)
30. A laser as in clause 28 wherein the alloy is Co90Cu10 wt %.
31. A laser comprising:
a discharge chamber; and
a first electrode positioned at least partially within the discharge chamber, the first electrode comprising an alloy of copper and silver.
32. A laser as in clause 31 wherein the alloy is Cu(x)Ag (100−x) wt % where x is in the range of about 95 to about 60.
33. A laser as in clause 31 wherein the alloy is Cu60Ag40 wt %.
34. An electrode for a laser chamber, the electrode comprising an alloy of a first metal having a first free energy of formation with fluorine greater than or equal to the free energy of formation with fluorine of copper, and a second metal having a second free energy of formation with fluorine less than the first free energy.

The invention claimed is:

1. An electrode for a laser chamber, the electrode being one of an upper electrode and a lower electrode between which electrical discharges cause lasing gas discharges, the electrode comprising an alloy of a first metal having a first free energy of formation with fluorine greater than or equal to the free energy of formation with fluorine of copper, and a second metal having a second free energy of formation with fluorine less than the first free energy.

2. An electrode for a laser chamber as claimed in claim 1 wherein the first metal is cobalt.

3. An electrode for a laser chamber as claimed in claim 1 wherein the second metal is copper.

4. An electrode for a laser chamber as claimed in claim 1 wherein the first metal is cobalt and the second metal is copper.

5. An electrode for a laser chamber as claimed in claim 4 wherein the alloy is CoCu (5-15 wt %).

6. An electrode for a laser chamber as claimed in claim 5 wherein the alloy is Co90Cu10 wt %.

7. An anode configured to be used in a laser discharge chamber, the anode comprising an alloy of cobalt and copper.

8. An anode as claimed in claim 7 wherein the alloy comprises Co90Cu10 wt %.

9. An anode as claimed in claim 7 wherein the alloy comprises CoCu (5-15 wt %).

10. An electrode for a laser chamber, the electrode being one of an upper electrode and a lower electrode between which electrical discharges cause lasing gas discharges, the electrode comprising cobalt as a primary constituent and copper as a secondary constituent.

11. An electrode for a laser chamber as claimed n claim 10 wherein the alloy is CoCu (5-15 wt %).

12. An electrode for a laser chamber as claimed in claim 11 wherein the alloy is Co90Cu10 wt %.

* * * * *